UNITED STATES PATENT OFFICE.

JAMES P. PORTEUS, OF KIRKWOOD, MISSOURI.

SWEEPING COMPOUND AND PROCESS OF MAKING SAME.

958,007.     Specification of Letters Patent.     Patented May 17, 1910.

No Drawing.     Application filed June 1, 1908. Serial No. 435,853.

*To all whom it may concern:*

Be it known that I, JAMES P. PORTEUS, a citizen of the United States, residing at Kirkwood, St. Louis county, Missouri, have invented a certain new and useful Improvement in Sweeping Compounds and Processes of Making Same, of which the following is a full, clear, and exact description, such as will enable others skilled in the art to which it appertains to make and use the same.

This invention relates to sweeping compounds, namely, compositions of matter that are used for laying, collecting or absorbing dust and the disease germs or microbes therein.

One object of my invention is to provide a sweeping compound that is also an inodorous and safe, disinfecting and deodorizing compound.

Another object of my invention is to provide a sweeping compound that will not stain the surface or materials on which it is used and which will not form into lumps while it is being used.

Another object of my invention is to provide a moist and viscid sweeping compound that does not depend for its moisture upon the presence or incorporation of hygroscopic salts. And still another object of my invention is to provide a process for producing the sweeping compound above described.

Other objects and desirable features of my invention will be hereinafter pointed out.

Briefly described, my improved sweeping compound consists of a moist macerated, shredded, or finely comminuted absorbing substance, such, for example, as sawdust, having a viscid or sticky substance mixed therewith. The absorbing substance has a sufficiently viscid or sticky surface to hold the particles of dust or germs with which it may come in contact during the operation of sweeping, but it is not viscid enough to cause the compound to stain the surface or fabric on which it is used, or form into lumps or adhere to said surface or fabric.

The compound also comprises deodorizing and disinfecting chemicals so that it forms a very efficient dust-absorbing and disinfecting composition of matter that is free from oil.

To produce the compound above referred to I first moisten a quantity of sawdust with water to which has been added an aqueous solution of ferrous sulfate that contains about two per cent. of ferrous sulfate, the sawdust forming about a third of the completed mixture. Preferably, I use about one quart of water and one quart of solution to 25 lbs. of sawdust, the sawdust and moistening substance being mixed together in any suitable form of mixing apparatus until the aqueous solution is thoroughly incorporated with the particles of sawdust. The action of the ferrous sulfate on the tannin in the particles of sawdust produces a peculiar greenish color due to the development of tannate of iron, the intensity of the color depending upon the percentage of the tannin in the sawdust.

The length of time that the sawdust and solution are agitated in the mixing apparatus depends upon the general conditions under which the process is carried out and the nature of the materials used but this can be conveniently determined by inspecting the mixture from time to time. The main object of mixing the aqueous solution of ferrous sulfate with the sawdust is to incorporate therewith a deodorizing substance and also color the sawdust, but it is not necessary to agitate the mass until a certain color is obtained for sawdust formed from certain kinds of woods will be acted upon more quickly than others due to the fact that they have a higher percentage of tannin. The mass is agitated until the solution is thoroughly absorbed by the sawdust and if the desired color has not been obtained by the time the solution and sawdust have been thoroughly mixed together it will eventually be obtained by the chemical action of the ferrous sulface on the tannin in the sawdust.

The next step in the process is to introduce a disinfectant, said disinfectant preferably being added to the mixture after the sulfate has been thoroughly mixed with the sawdust. Various disinfectants can be used and I do not wish it to be understood that my improved sweeping compound is limited to any particular disinfectant. When the compound is to be used for household or general purposes an aqueous solution of chlorid of aluminum can be mixed with the sawdust and ferrous sulfate and when the compound is to be used in sanatoriums, hospitals, public halls and vehicles a stronger disinfectant can be used.

While I prefer to use a disinfectant in an aqueous solution, it will, of course, be obvious that a dry disinfectant can be used without departing from the spirit of my invention.

As previously stated, my improved compound contains a viscid non-oily substance. Various substances having these characteristics can be used, such, for example, as glycerin, glucose, molasses, corn, cane or wood syrup, silicate of sodium, or in fact, any substance of a viscid non-oily nature, the substance that is used being preferably introduced into the mass of sawdust and chemicals in an aqueous solution. While I prefer to use a substance that is viscid in its natural condition, it will, of course, be obvious that I could use a substance that is dry in its natural condition and which becomes viscid when it comes in contact with a moist or wet substance. Dextrin, for example, which in its natural condition is a dry powder, could be used for this purpose for when it comes in contact with the damp sawdust it will become viscid.

If the compound is to be used principally for households or for general purposes I prefer to use about 4 lbs. of glucose to 25 lbs. of sawdust. This glucose is preferably mixed with the sawdust and chemicals previously referred to in the mixing apparatus and when the particles of the mass are thoroughly coated with the glucose and the mass is mixed sufficiently to be free from lumps and in a loose damp state I add a substance which imparts weight to the mixture so that it will be more effective in cutting accumulated dust and also enable the mixture to restore colors to carpets, rugs and other textiles. I prefer to use loose chlorid of sodium for this purpose and mix it in about the following proportions; namely, 25 lbs. of sawdust to 25 lbs. of chlorid of sodium. If desired, an abrading substance, such, for example, as silica, clean sand or any other suitable abrasive material can be added to the mixture if the compound is intended to be used on rough surfaces such as wooden floors, in public halls, vehicles, etc., where large quantities of dust and dirt accumulate.

The composition of matter above described forms a very efficient sweeping compound for laying and absorbing dust and all flying particles raised in the process of sweeping and also forms a safe, deodorizing disinfectant which is free from oil or oily substances so that it will not damage or stain the surfaces upon which it is used. Furthermore, said sweeping compound is moist and viscid and does not depend for its moisture upon the presence or incorporation of hygroscopic salts. It quickly collects particles of dust as well as all the disease germs, microbes or bacteria associated therewith from the surface on which it is used and disinfects and deodorizes said surface without any liability of staining or injuring the surface.

Having thus described my invention, what I claim as new and desire to secure by Letters Patent is:

1. The process of producing a sweeping compound, which consists in mixing sawdust with an aqueous solution of ferrous sulfate, and thereafter mixing therewith a viscid or sticky non-oily substance, to render the sawdust sticky; substantially as described.

2. The process of producing a sweeping compound, which consists in mixing an absorbing substance with an aqueous solution of ferrous sulfate, and thereafter mixing with said mass glucose and an aqueous solution of chlorid of aluminum; substantially as described.

3. A sweeping compound comprising a mass of absorbent granular material mixed with an aqueous solution of ferrous sulfate and the particles of which mass are coated with glucose.

4. A sweeping compound comprising a mass of absorbent granular material mixed with an aqueous solution of ferrous sulfate, a disinfectant and the particles of which mass are coated with glucose.

5. The process of producing a sweeping compound, which consists in mixing a mass of absorbent granular material with an aqueous solution of ferrous sulfate, then combining with said mass a disinfectant, and then mixing with said mass a viscid non-oily substance in sufficient quantity to coat the particles of the entire mass.

6. The process of producing a sweeping compound, which consists in mixing an absorbent granular material with an aqueous solution of ferrous sulfate, then mixing a disinfectant with said mass, then coating the particles of said mass with a viscid non-oily substance, and then mixing with said mass a quantity of heavy granular material.

7. The herein-described sweeping compound, comprising sawdust moistened with an aqueous solution of ferrous sulfate, the particles of which sawdust are coated with a viscid non-oily substance, and the entire mass being mixed with a heavy granular material.

8. A sweeping compound, comprising a mass of sawdust treated with an aqueous solution of ferrous sulfate and with a liquid disinfectant, and the particles of which sawdust are coated with a viscid non-oily substance.

In testimony whereof I hereunto affix my signature in the presence of two witnesses, this 26th day of May 1908.

JAMES P. PORTEUS.

Witnesses:
M. E. HOLDEN,
H. CHAPMAN.